F. P. Pfleghar.

Fitting Locks to Doors

Nº 90,299.    Patented May 18, 1869.

Witnesses
H. Berkele
R. Fitzgerald

Inventor
F. P. Pfleghar

United States Patent Office.

FRANK P. PFLEGHAR, NEW HAVEN, CONNECTICUT.

Letters Patent No. 90,299, dated May 18, 1869.

IMPROVEMENT IN GUIDE FOR FITTING LOCKS TO DOORS.

The Schedule referred to in these Letters Patent and making part of the same.

*To all whom it may concern:*

Be it known that I, FRANK P. PFLEGHAR, of the city and county of New Haven, in the State of Connecticut, have invented a new and useful Improvement in Tools, or Clamps, to be used as a Guide in Fitting Locks, &c., to Doors; and I do hereby declare that the following is a full, clear, and exact description of the construction, character, and operation of the same, reference being had to the accompanying drawings, which make part of this specification, in which—

My improvement consists in making a block, with a series of holes through it, to serve as a guide for the auger, or bit, while boring for the mortise of the lock, and in fitting it with a pair of clamps, worked, or adjusted by a right and left-hand screw, to fit the thickness of the stile of the door, to adjust the guides, so that the auger, or bit will bore in the exact centre of the thickness of the stile, and in connecting therewith guides for boring the key-hole and the hole for the spindle.

Figure 1:
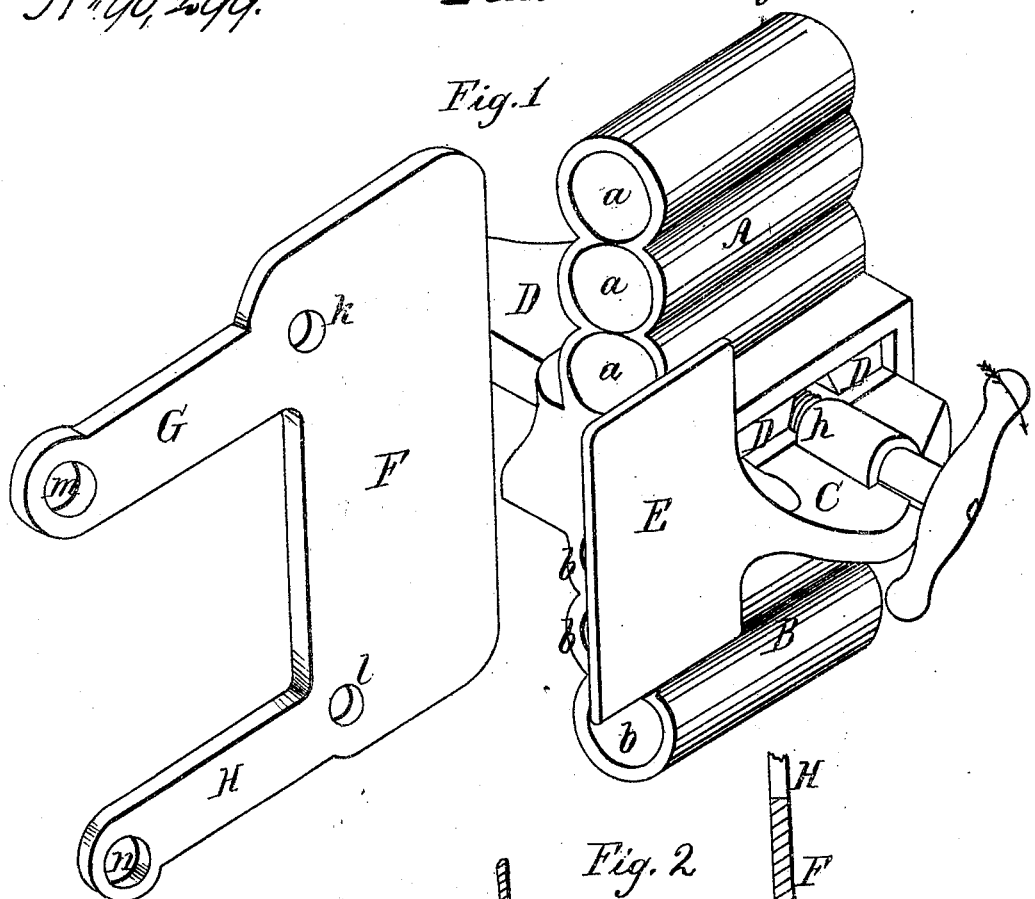
Figure 1 is a perspective view of the tool, ready for use.
Figure 2:
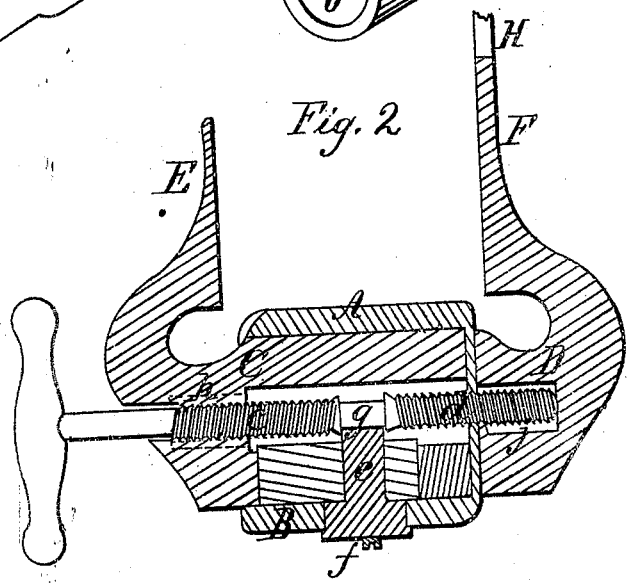
Figure 2 is a plan of the same, cut horizontally through the centre, showing the relative positions of the several parts, and their connections.

I make the block of cast-iron, or any other suitable material, substantially in the form represented at A and B, fig. 1, and indicated in section at A and B, fig. 2, with three, or any other convenient number of holes through each of its wings, as represented at $a\ a\ a$ and $b\ b\ b$, of the proper size to receive or admit the bit, or auger for boring the holes for the mortise, to receive the case of the lock, or lock and latch.

These holes, or guides, I make parallel, so that the auger, or bit will bore perfectly true, as represented at A and B, fig. 1; and I make those in one wing, as in A, larger than those in the other, as in B, as I intend them for fitting locks of different sizes, so that each tool will be suited for fitting two sizes of locks, and will be peculiarly appropriate for fitting locks the breadth of the cases of which is three times its thickness, which is the most suitable shape when the lock and latch are used together.

But any other number of holes, or guides may be made, to suit any particular class of locks, and may be made of any desired size, and each may be made for two sizes, or classes of locks, as represented in fig. 1, as the clamps will be the same.

Through the centre of this block A and B, and at right angles to the guides $a\ a\ a$ and $b\ b\ b$, I fit two slides, as C and D, one from each side, and connect them by a right and left-hand screw, as represented at C and D, in section, in fig. 2, and I hold this screw in its place by a suitable chock, or clutch, as shown at $e$, fig. 2, which fits between the collars on the screw-shank, as shown at $g$.

This chock I secure to the block A and B by a small screw, as indicated at $f$, when it will hold the screw $c\ d$ in its proper position, or prevent it from moving longitudinally.

To each of these slides C and D, I attach, or cast in one piece with it, a suitable plate, or clamp, as represented at E and F, to be pressed against the sides of the stile of the door, by the operation of the adjusting-screw $c$ and $d$, each part of which works in a suitable internal, or female thread, as indicated at $h$ and $j$, fig. 2, and at $h$, fig. 1, so that, by revolving the screw $c$ and $d$ in the direction indicated by the dart in fig. 1, it will cause the clamps $e$ and $f$ to move simultaneously and equally toward the guides $a\ a\ a$ and $b\ b\ b$, until they come in contact with the opposite sides of the stile of the door, when the guides will be in the position to receive the auger, or bit, which may then, by the most unskilful hand, be used to bore exactly perpendicularly to the edge, and parallel to the sides of the stile, so as not to injure the door, or misfit the lock.

On one of the plates, or clasps F, I cast, or fit two extensions, or projecting parts, as represented at G and H, fig. 1, in each of which I make two suitable holes, one, as $k$ or $l$, as a guide, through which to bore the key-hole, and the other, $m$ or $n$, as a guide through which to bore the hole for the spindle of the knobs.

In the present case, the holes $k$ and $m$ are fitted for use with the large guides $a\ a\ a$, and the holes $l$ and $n$ to use with the smaller guides $b\ b\ b$, in the lock and latch, for which my application for a patent is now on file in the Patent Office, but they may be made to fit any class of locks, or lock and latch, which may be made, by simply furnishing a specimen of the lock to the maker of the tool.

Having made the several parts, I fit the two slides C and D, and the right and left-hand screw $c\ d$, and secure the screw by the chock $e$, resting between the collars of the shank of the screw, as represented at $g$, fig. 2, taking special care that the screw $c\ d$ is so arranged in the internal, or female thread, at $h$ and $j$, as to keep the plates, or clamps E and F, at equal distances from the centre of the guides $a\ a\ a$ and $b\ b\ b$, so that when the parts are thus fitted together, the whole will appear as represented in fig. 1, and be ready for use.

To use this tool, when the clamping plates E and F are sufficiently open, I pass them on to the stile of the door, until the face of the guides $a$ and $b$ sit flat against the edge of the stile. I then revolve the screw $c\ d$ in the direction indicated by the dart in fig. 1, until the two plates E and F press the opposite sides of the stile.

I then insert the auger, or bit into the guide, and bore as many holes as the width of the lock-case requires; and if I use the guides $a$, &c., I bore the key-hole at $k$, and the spindle-hole at $m$; but, if I use the guides $b$, &c., I bore the key-hole at $l$, and the spindle-hole at $n$.

The advantages of my improvement consist in that, by the use of this tool, an inexperienced person may fit a lock with accuracy, while the most experienced will find it extremely convenient, as it obviates the necessity of measurement and considerable care, especially with thin doors.

What I claim as my invention, and desire to secure by Letters Patent, is—

The combination of the block A B, clamps E and F, chock $e$, and screw $c\ d$, when all the parts are constructed and arranged to operate as shown, and for the purposes substantially as herein described.

F. P. PFLEGHAR.

Witnesses:
R. FITZGERALD,
H. BERKELE.